Patented Dec. 8, 1925.

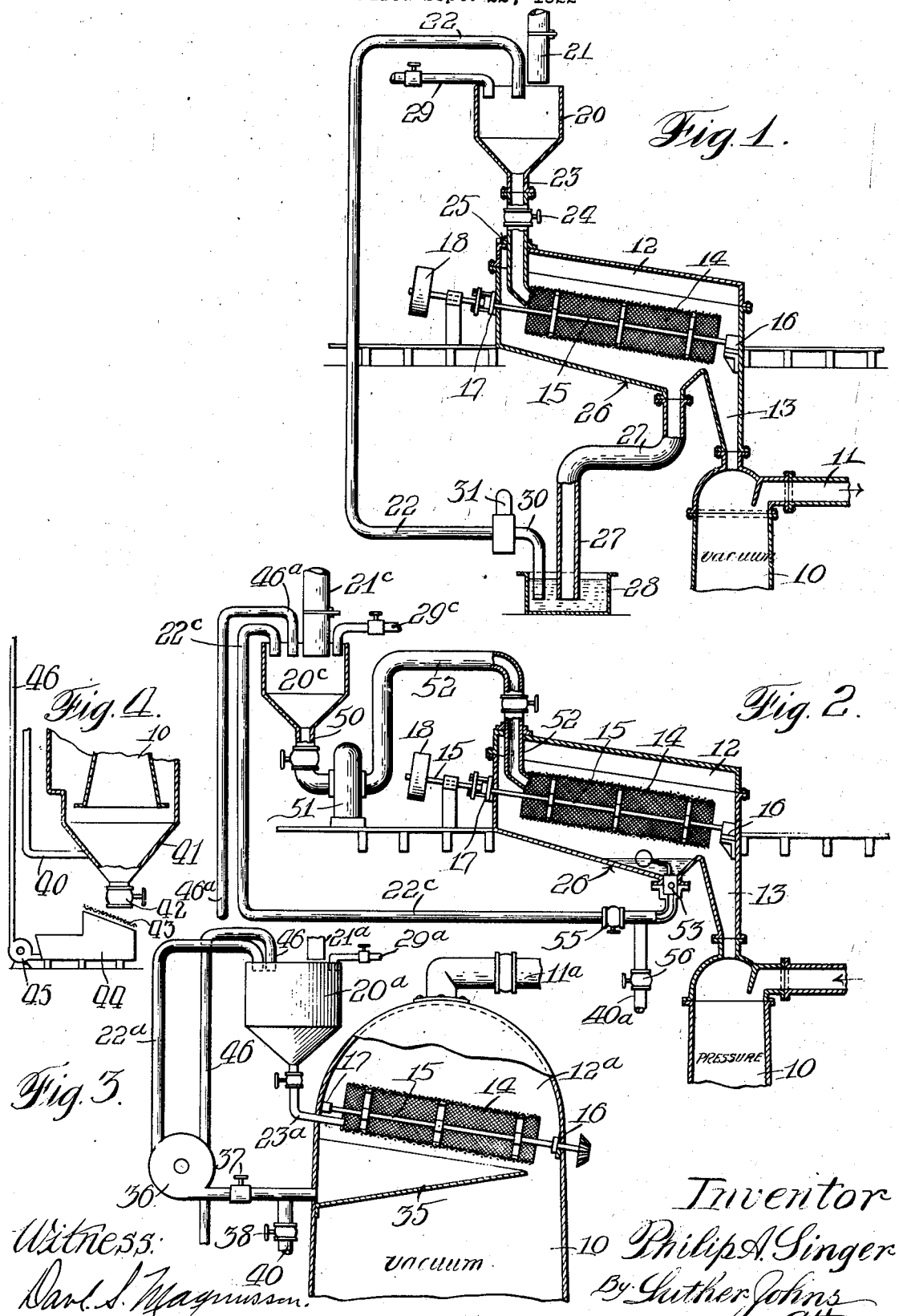

1,564,980

UNITED STATES PATENT OFFICE.

PHILIP A. SINGER, OF GLEN ELLYN, ILLINOIS.

METHOD AND MEANS FOR INTRODUCING MATERIAL INTO A CHAMBER.

Application filed September 22, 1922. Serial No. 589,955.

*To all whom it may concern:*

Be it known that I, PHILIP A. SINGER, a citizen of the United States, residing at Glen Ellyn, Du Page County, Illinois, have invented certain new and useful Improvements relating to Methods and Means for Introducing Material into a Chamber, of which the following is a specification.

In my Patent No. 1,511,238 of October 14, 1924 on methods for treating material, the application for which was filed concurrently with the filing of this application, and in my copending application known as Serial No. 737,225, filed September 12, 1924 on devices for treating material, I have shown a device for treating material by a liquid, the device including a treating receptacle or chamber the upper portion of which above the surface of the treating liquid being under a partial vacuum during the treating process. In such and other instances wherein it is desired to feed material into a chamber under partial vacuum, or in instances where the treatment of the material in the chamber may be by a gas, it is preferable and in some instances it might even be essential that the material be introduced from the outer air without the admission of air to the treating chamber.

The materials to be treated may be grains, fruits or vegetables, either whole or divided, or it may be various kinds of animal, mineral or vegetable matter in ground, chopped, comminuted, crushed, or naturally amorphous form, in all instances with a considerable amount of air between the parts or particles of the mass, and which air would be carried into the chamber if the material were fed in its ordinary condition into the receptacle.

The treating receptacle fragmentarily shown in this application is well adapted for such uses as the steeping of grains, the extraction of sugar juice from beets, etc., for the washing of black ash in the soda industry, for the extraction of oil from seeds and other materials, and for other purposes where such actions as washing, leaching, steeping, softening or extracting, etc., take place. Some materials may be treated by means of a gas, for instance chlorine, for bleaching, or by various gases for sterilizing purposes or for producing a chemical change in the composition of the material; and the treating chamber may also be used for impregnating certain materials, for instance, wood in smaller bulk forms and which may be charged, for instance, with creosote. The present improvements may be applied to treating receptacles of various kinds in various industries, and those fragmentarily shown in this application and more fully shown in my copending application and said patent are merely illustrative of certain advantageous applications of the present improvements without limiting the application thereof to various others.

The present improvements have for their chief object the provisions of methods and means for introducing such material into a chamber without the admission therewith of any or a material or substantial amount of outer air.

Such air introduced with the material through an open gate would seriously affect the possibility of maintaining a desired degree of partial vacuum in the treating receptacle, and in all probabilities would prevent it. This would be particularly true where the process of introducing the material is a continuous one. Where the treatment is by pressure, the opening of a gate to admit the material would of course result in loss of pressure. Where the treatment is by a gas such introduced air would lessen or destroy the efficacy of the gas, and the opening of a gateway for introducing the material would result in loss of gas therethrough, and, further, if the gas were a deadly one the results might also be highly dangerous. These improvements therefore make possible better and more complete and also different advantageous results in the treatment of a large variety of materials by treating liquid or gas or both, under partial vacuum or by pressure, save cost and time to a materially large extent, and yield other advantages readily to be appreciated by those skilled in the art. A specific object is to provide simple means for such purpose, means which may be cheaply made and used, which are not likely to get out of order, which may be provided for operation at high or low capacity as may be desired, and which are highly effective; and also to provide a method which may be simply, cheaply, expeditiously and effectively employed for the purpose mentioned. It is an object also to provide a method and means for introducing such material into a chamber against air or other gaseous pressure therein.

In the accompanying drawings, which form a part of this specification, the figures show the respective devices in substantially medial vertical section, with some parts shown in full, Figure 1, showing a preferred form of device for feeding the material into a vacuum chamber; Fig. 2 being a preferred embodiment where the treating chamber contains pressure; Fig. 3 being a modification of the device of Fig. 1; and Fig. 4 showing, on a smaller scale, the lower portion of a treating receptacle the upper portion of which is shown in the other figures.

My improved method comprises the introduction of the material into the treating chamber simultaneously with a body of liquid which so surrounds the parts or particles of the material as to exclude the outer air. More specifically it includes the separation of the material and the liquid after such introduction, and, further, in the carrying away of the liquid with which the material was introduced. According to the illustrated means the method is carried out by introducing the material and the liquid into a chamber having a separating part and a treating part, the material passing from the separating part to the treating part and the separated liquid being conveyed away.

Referring to Fig. 1 the treating receptacle 10 may be considered to be a portion of any appropriate receptacle for the treatment of the material by liquid or by vapor or gas. Specifically it is shown as the top portion of a treating receptacle illustrated and described in my said patent and copending application, to which reference may be made. It may be considered that the pipe 11 is in communication with means for producing a partial vacuum within the receptacle 10. The separating chamber 12 may be considered as being a substantially air tight structure formed of sheet metal which is in communication with the chamber 10 through the conduit 13. A cylindrical screen 14 of a well known type, open at each end and mounted on a shaft 15 journaled at 16 and 17, is adapted to be rotated within the chamber 12, as by the pulley 18. A hopper 20 is adapted to receive material to be treated through the pipe 21 while liquid to be carried into the separating chamber with the material enters the hopper through the pipe 22. The material passes from the hopper into the separating chamber through the pipe 23 having the valve 24, the pipe having a tight connection with the casing walls at 25. The lower end of the pipe 23 is formed to discharge the material and the liquid into the hollow interior of the foraminous cylinder 14, which is downwardly inclined, and, as the screen device rotates, the material moves gravitationally downward and is finally discharged into the conduit 13 from which it passes into the treating chamber 10. The water separated from the material falls upon the depressed bottom or sump at 26 and passes thence through the pipe 27 to an open receptacle 28 into which the pipe 27 extends sufficiently to produce what is commonly known as a liquid trap which seals the chamber 12 against the admission of air at the lower end of the pipe 27. It is to be understood that the vertical height of the pipe 27 will be sufficient to insure the flow of liquid downward through it against the influence of the partial vacuum in the chambers 10 and 12. From the trap 28 a pipe 30 leads to a pump 31 by which the separated liquid is forced through the pipe 22 back to the hopper 20. According to this construction the same liquid may be continuously used.

From the description thus given it will be clear that not only may the material be thus introduced into the chamber 10 without the admission of a substantial amount or any appreciable quantity of outer air, but that this may be done as a continuous operation, a feature highly advantageous in the use of such methods and devices as are described in my said patent and copending application, or otherwise, as particular arts or practices may suggest.

Referring to Fig. 3, wherein like parts are given the same reference characters, the separating chamber 12ª is shown as the upper part of the treating chamber or receptacle 10. The material and the liquid are introduced into the hopper 20ª through the pipes 21ª and 22ª respectively and from the hopper the material passes through the pipe 23ª to the screen device 14. The material is discharged from the screen directly into the treating chamber 10 while the separated liquid falls upon the downwardly inclined trough 35 from which it may be drawn by the pump 36 and forced back through the pipe 22ª into the hopper 20ª; or the valve 37 may be closed and the valve 38 opened whereby the liquid may be allowed to pass through the pipe 40 and conveyed to some other part of the apparatus, for instance, to the lower part of the receptacle 10, as to the trap device 41, shown in Fig. 4 surrounding the open lower end of the tubular member 10.

According to Fig. 4 the treated material is drawn off through the valve 42 as a continuous operation and falls upon the screen 43 and the treating liquid descends into the collecting tank 44, from which it may be forced by the pump 45 through the pipe 46 back to the hopper 20ª. The liquid introduced with the material may therefore be the treating liquid, among the advantages of which are that the treatment of the material begins in the introducing hopper, that of the mechanical action upon the material in the presence of the treating liquid due to its passage through the introducing pipe and its being tumbled about by the screen device, and, further, that the material is at once coated by the treating liquid and not by some other liquid whereby such absorption as takes place by the material is of the treating liquid, all inducing a more rapid treatment of the material.

Referring now to Fig. 2 in which like parts are given the same reference characters, the construction of the several parts closely follows that shown in Fig. 1. According to the structure of Fig. 2 the treating chamber 10 may be under pressure, placing the separating chamber 12 similarly under pressure. The material is introduced into the hopper 20ᶜ through the pipe 21ᶜ and passes, together with liquid from the pipe 22ᶜ, through the pipe 50 to the pump 51 which forces the material and the liquid through the pipe 52 to the rotating screen device 14 from which the material is discharged as in Fig. 1 into the receptacle 10. The separated water collects at 26 and when it rises therein to a sufficient height the float-controlled valve 53 opens and the liquid is forced through the pipe 22ᶜ back to the hopper, or the valve 55 may be closed and the valve 56 opened whereupon the introducing liquid may pass downward through the pipe 40ᵃ, which may be considered the same as the pipe 40 shown in Figs. 3 and 4, and the return pipe 46ᵃ of Fig. 2 may be considered the same as the return pipe 46 shown in Figs. 3 and 4.

Since there is always some wastage and loss of liquid, an additional supply to the hopper 20 of Fig. 1 may be had through the pipe 29, and such additional supply may be had to the hopper 20ᵃ of Fig. 3 through the pipe 29ᵃ, and in Fig. 2 the additional supply may be had through the pipe 29ᶜ. In most instances the liquid supplied through the pipes 29, 29ᵃ and 29ᶜ respectively may be ordinary water, but where the material is to be treated by a treating liquid the additional supply will in some cases be that of the treating liquid. The liquid introduced with the material may be the treating liquid in most instances, whether the treating liquid flow from the separating chamber back to the introducing hopper or whether it flow from the separating chamber to that part of the treating receptacle where the material is chiefly to be treated. If the treatment in the treating receptacle should be by means of a vapor or gas or a liquid the liquid introduced with the material at the introducing hopper may be water or it may be a solution or a chemical compound with which the material may advantageously be coated or impregnated in order to obtain the desired treatment by the vapor or gas or other liquid.

While I have thus set forth my improved method and several forms of apparatus by which it may be practiced in a highly advantageous way, it will be evident to those skilled in the art that various changes, modifications and departures may be made within the teachings herein given without departing from the spirit of these improvements, and reference should be had to the appended claims to determine the scope of the invention herein set forth.

In the appended method claims the term "solid material of the character described" refers to such as is described in the third paragraph of the foregoing description, and is characterized by the fact that in the mass there are many voids, owing to the shape of the parts or particles, and that in all instances there is a considerable amount of air occupying these voids and which air would be carried into the treating chamber if the material in its ordinary condition were fed thereinto.

Since the term "partial vacuum" defines a negative pressure condition, or one less than atmospheric, while "pressure" defines a positive pressure condition or one more than atmospheric, the expression "adapted to maintain a pressure condition therein other than atmospheric" as used in some of the claims defines a condition which may be either partial vacuum or pressure, according to the particular application, use or materials employed.

I claim:

1. The method of introducing solid material of the character described from the outer air into the treating portion of a treating chamber while maintaining the chamber substantially free of outer air introduced with the material which comprises simultaneously introducing into a separating portion of the chamber the material to be introduced into the treating portion thereof and also a body of liquid in which the material is carried into the chamber, separating the solid material from the liquid before the solid material is introduced into the treating portion of the chamber, and then introducing the solid material into the treating portion of the chamber.

2. The method of introducing solid material of the character described from the outer air into the treating portion of a treating chamber while maintaining the chamber substantially free of outer air introduced with the material which comprises simultaneously introducing into a portion of the chamber the material to be introduced therein and also a body of liquid in which the material is carried into the chamber, separating the material from the liquid within such portion of the chamber, and then discharging the separated material into the treating portion of the chamber.

3. The method of introducing solid material of the character described from the outer air into the treating portion of a chamber while maintaining the chamber substantially free of outer air introduced with the material which comprises simultaneously introducing the material into a separating portion of the chamber and also a body of liquid in which the material is carried into the chamber, separating the material from the liquid within the separating portion of the chamber, discharging the separated material into the treating portion of the chamber substantially free of the introducing liquid, and conducting the separated liquid away from the chamber.

4. The method of introducing solid material of the character described from the outer air into the treating portion of a treating chamber for treatment by a liquid while maintaining the chamber substantially free of outer air introduced with the material which comprises simultaneously introducing into the upper portion of the chamber the material to be introduced therein and also a body of the treating liquid in which the material is carried into the chamber, separating in such upper portion the material from the liquid with which it was introduced, and discharging the material downward into the treating portion of the chamber.

5. The method of introducing solid material of the character described into a treating chamber having a body of treating liquid and being adapted to maintain a pressure condition therein other than atmospheric which comprises introducing into the chamber a mixture of the material and a liquid, separating the material out of the mixture in a portion of the chamber which does not contain the body of treating liquid, withdrawing the liquid with which the material was introduced, and discharging the separated material substantially free from liquid into the body of treating liquid in the chamber.

6. The method of introducing material of the character described from the outer air into the treating portion of a treating chamber for treatment therein by a liquid while maintaining the chamber substantially free of outer air introduced with the material which comprises simultaneously introducing into the chamber the material to be introduced therein and also a body of the treating liquid in which the material is carried into the chamber, separating the material from the liquid within the chamber before the material is discharged into the treating portion of the treating chamber, discharging the separated material into the treating portion of the treating chamber, and conducting the separated liquid away from the chamber.

7. The method of introducing material of the character described from the outer air into the treating portion of a treating chamber for treatment therein with a liquid while maintaining the chamber substantially free of outer air introduced with the material which comprises simultaneously introducing into the chamber the material to be introduced therein and a body of the liquid with which the material is to be treated and in which the material is carried into the chamber, separating the material from the liquid within the receptacle before the material is discharged into the treating portion of the treating chamber, discharging the separated material into the treating portion of the treating chamber, and conducting the separated liquid back to the place where the material is introduced into the chamber for use in introducing further material into the chamber.

8. In a device of the character described, the combination of means forming a receptacle having a treating portion and a material-receiving portion and being adapted to maintain a pressure condition therein other than atmospheric when the device is in use, means for simultaneously introducing into the receiving portion of the receptacle the material to be treated and a body of liquid in which the material is carried into the receptacle, means in the receiving portion of the receptacle for separating the material from the liquid, and means for discharging the material into the treating portion of the receptacle substantially free from the liquid introduced with the material.

9. In a device of the character described, the combination of means forming a receptacle having a treating portion and a material-receiving portion and being adapted to maintain a pressure condition therein other than atmospheric when the device is in use, means for simultaneously introducing into the receiving portion of the receptacle the material to be treated and a body of liquid in which the material is carried into the receiving portion of the receptacle, rotary screen means in said receiving portion for separating the material from the liquid for discharge into the treating portion of the receptacle, and means for carrying away from said separating means the liquid separated from the material to maintain the treating portion of the receptacle substantially free from the liquid with which the material was introduced.

10. In a device of the character described, the combination of means forming a receptacle adapted to maintain a pressure condition therein other than atmospheric when the device is in use, the receptacle having two parts, one thereof being a separating part and the other thereof being a treating part, said parts being in communication with each other for the passage of material from one to the other thereof, means for simultaneously introducing into the separating part the material to be treated and a body of liquid in which the material is carried into the separating part, and means in said separating part for separating the material from the liquid and discharging the material substantially free from the introducing liquid into the treating part of the receptacle.

11. In a device of the character described, the combination of means forming a receptacle adapted to maintain a pressure condition therein other than atmospheric when the device is in use, the receptacle having two parts, one thereof being a separating part and the other thereof being a treating part, said parts being in communication with each other for the passage of material from one to the other thereof, means for simultaneously introducing into the separating part the material to be treated and a body of liquid in which the material is carried into the separating part, means in said separating part for separating the material from the liquid and discharging the material into the treating part, and means for carrying away from said separating part the liquid separated from the material.

12. In a device of the character described, the combination of means forming a receptacle having a treating part and a separating part and being adapted to maintain a pressure condition therein other than atmospheric when the device is in use and also adapted to contain treating liquid in the treating part, a screen device within the separating part of the receptacle, pipe means for carrying to said screen device from outside the receptacle a body of liquid carrying with it solid material to be treated, and means for maintaining the treating part of the receptacle free from the liquid introduced with the material.

13. In a device of the character described, the combination of means forming a receptacle having a treating part and a separating part and being adapted to maintain a pressure condition therein other than atmospheric when the device is in use, a hopper outside of said receptacle, a screen device with the separating part of the receptacle for separating solid matter from a liquid, pipe means extending from the hopper to the screen device so as to discharge solid material and liquid from the hopper upon the screen device, and means for maintaining the treating part of the receptacle free from the liquid introduced with the material.

14. In a device of the character described, the combination of means forming a receptacle having a treating part and a separating part and being adapted to maintain a pressure condition therein other than atmospheric when the device is in use, a hopper outside of said receptacle, a screen device within the separating part of the receptacle for separating solid material from a liquid, pipe means extending from the hopper to the screen device so as to discharge material from the hopper thereon, and means for conveying separated liquid away from the receptacle to maintain the treating part of the receptacle free from the liquid introduced with the material.

PHILIP A. SINGER.